United States Patent [19]
Accorsi

[11] Patent Number: 5,988,250
[45] Date of Patent: Nov. 23, 1999

[54] APPARATUS FOR PRODUCING CONTAINERS WITH A FILM MADE OF THERMOPLASTIC SYNTHETIC MATERIAL

[75] Inventor: Marco Accorsi, Reggiolo, Italy

[73] Assignee: Trimat S.r.l., Reggiolo, Italy

[21] Appl. No.: 09/009,250

[22] Filed: Jan. 20, 1998

Related U.S. Application Data

[62] Division of application No. 08/571,565, Dec. 13, 1995, Pat. No. 5,743,988.

[30] Foreign Application Priority Data

Dec. 23, 1994 [IT] Italy .................................. MO94A0173

[51] Int. Cl.$^6$ ............................. B29C 49/00; B32B 31/14
[52] U.S. Cl. .......................... 156/498; 156/500; 425/523; 425/535; 425/539
[58] Field of Search ..................................... 156/382, 498, 156/500, 510; 425/523, 535, 538, 539

[56] References Cited

U.S. PATENT DOCUMENTS

| | | |
|---|---|---|
| 762,064 | 7/1904 | Kepler . |
| 3,070,479 | 12/1962 | Meyer . |
| 3,072,959 | 1/1963 | Leeds . |

FOREIGN PATENT DOCUMENTS

| | | |
|---|---|---|
| 0479152 | 4/1992 | European Pat. Off. . |
| 3141069 | 5/1983 | Germany . |
| 3929664 | 3/1991 | Germany . |
| 9408852 | 4/1994 | WIPO . |

*Primary Examiner*—Sam Chuan Yao
*Attorney, Agent, or Firm*—Guido Modiano; Albert Josif

[57] ABSTRACT

An apparatus for producing containers with a film made of thermoplastic synthetic material, having elements for advancing, along an advancement direction, two facing strips of film made of thermoplastic synthetic material; a thermal bonding station including thermal-bonding half-molds which face said two strips of film on opposite sides thereof along the advancement direction of the two strips of film, the thermal-bonding half-molds being adapted to thermally bond the strips of film to each other at preset regions thereof so as to form thermal bond regions delimiting between the two strips of film, a plurality of pouches that are each open at a longitudinal edge end of the two strips of film; a cooling station arranged downstream of the thermal bonding station along the advancement direction and including cooling half-molds being shaped so as to carry out a film strip cooling which is limited only to the thermal bond regions; a thermoforming station, arranged downstream of the cooling station and including a forming mold enclosing molding cavities that are adapted to accommodate each a pouch with portions of the thermal bond regions delimiting the respective pouch arranged inside the molding cavity, which cavity is further provided with an opening located at the open end of the enclosed pouch; and pressurized-fluid injectors for injecting pressurized fluid through the openings of the molding cavities into the pouches.

9 Claims, 4 Drawing Sheets

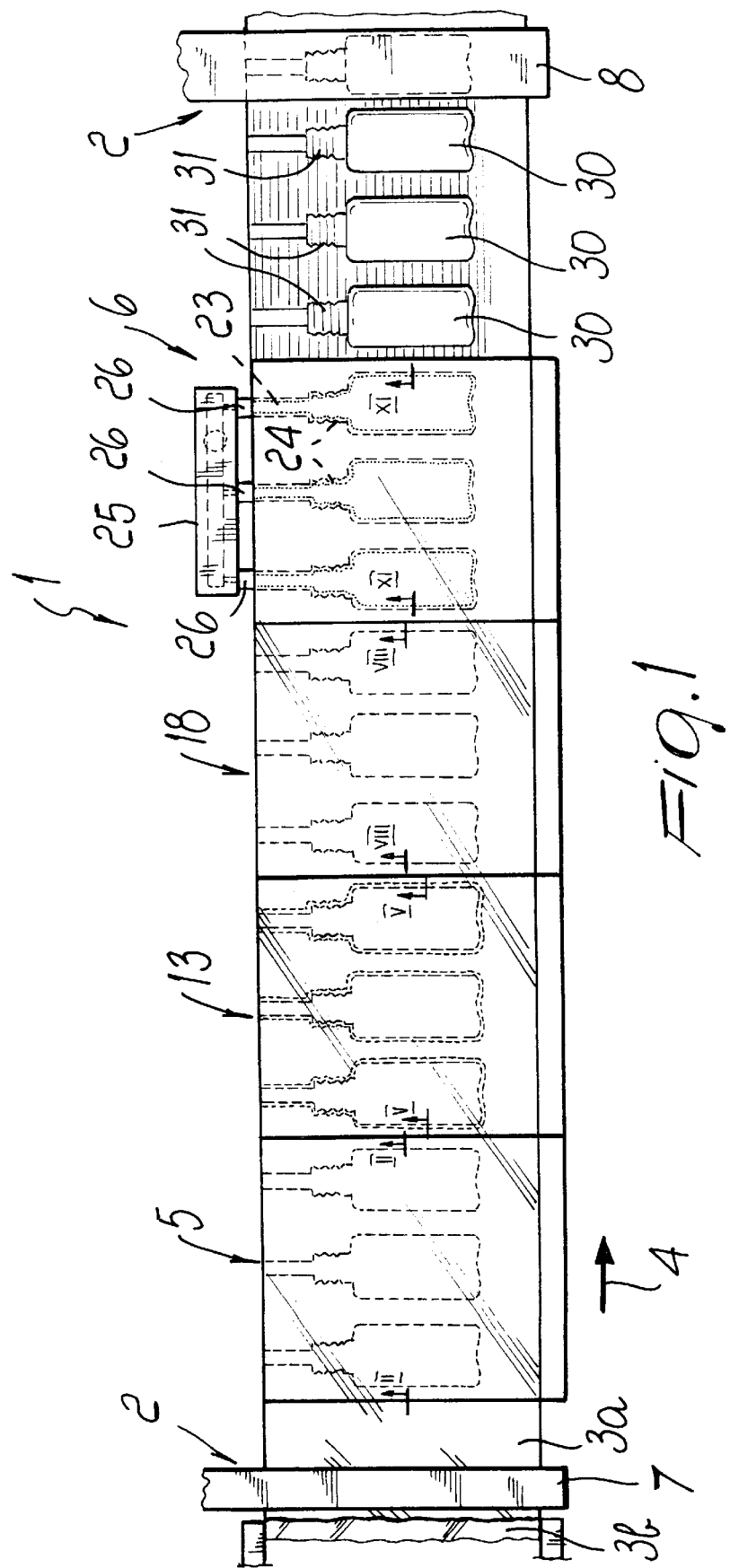

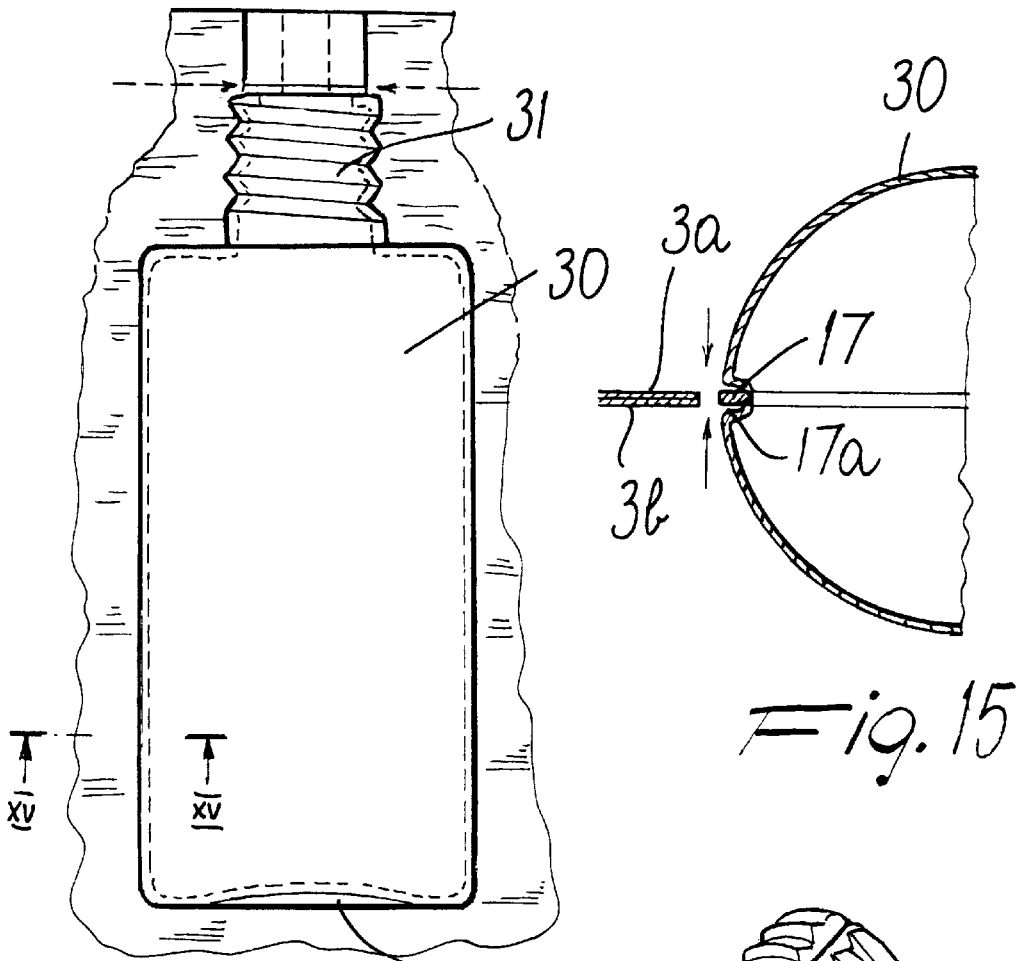
Fig. 14
Fig. 15
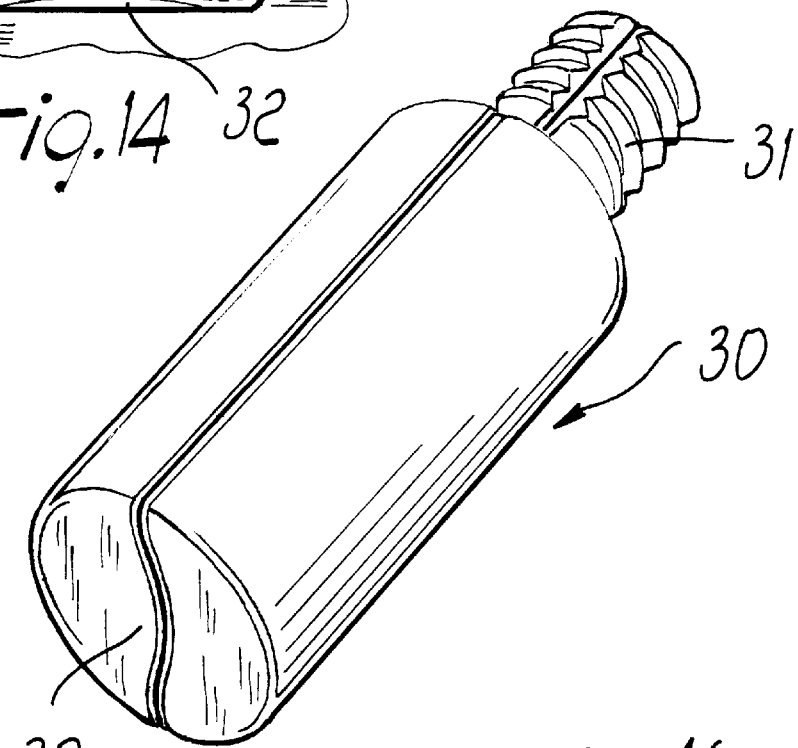
Fig. 16

APPARATUS FOR PRODUCING CONTAINERS WITH A FILM MADE OF THERMOPLASTIC SYNTHETIC MATERIAL

This application is a divisional application of Ser. No. 08/571,565 filed on Dec. 13, 1995, now U.S. Pat. No. 5,743,988.

BACKGROUND OF THE INVENTION

The present invention relates to a method for producing containers, such as bottles or the like, with film of thermoplastic synthetic material, and to an apparatus for carrying out such method.

Conventional methods for producing bottle-like containers, starting from a film of thermoplastic synthetic material, generally consist in performing, by means of an appropriate mold, the thermal bonding of two mutually facing strips of film so as to form, between the two strips, pouches that are open at a longitudinal edge of the strips of film.

The two strips thus bonded are preheated at the regions occupied by the pouches and are then inserted in a forming mold composed of two half-molds, facing one another on opposite sides with respect to the strips of film and in which there are molding cavities that are mutually spaced so as to match the distance between the pouches, so that each pouch is located in a molding cavity.

Each molding cavity has, at the open side of the pouches, an opening through which a nozzle is inserted; after closing the mold, said nozzle injects a jet of compressed air in the corresponding pouch, inflating it and causing the regions of the film that delimit the pouch to adhere to the walls of the molding cavity, duplicating their shape.

The substance to be packaged is introduced in the containers thus obtained through the side that has remained open, and the container is then sealed by thermal bonding at the open side.

Containers obtained with this method have considerably lower production costs than containers made of plastics obtained by extrusion and blowing, but they have some drawbacks.

The main drawback is the presence of a ridge that protrudes from the contour of the container and is constituted by the heat-bonded region that joins the two strips of film used to produce the container.

The presence of this protruding ridge prevents the container from assuming an upright position and thus prevents its use for all products which, due to display or utilization requirements, are traditionally packaged in bottles, vials, or in any case containers that have an elongated shape and are meant to be kept upright.

The thermal bonding ridge surrounds the entire container and makes complicated to close it after opening, which is achieved by cutting or tearing the film that constitutes the container. In order to obviate this drawback, containers have been produced with the addition of appropriate closure-supporting inserts for the application of screw closures, but the application of these inserts complicates the production process and increases the production costs of the container.

On the other hand, the thermal bonding ridge prevents the possibility of providing, directly during the molding stage, a threaded neck to allow the application of a closure.

The thermal bonding ridge causes other drawbacks, such as for example discomfort in handling the container and difficulty in packaging and in public display.

The thermal bonding ridge, of these conventional containers does not allow to use the method consisting in covering with a shrink-wrap printed tubular part, in order to achieve excellent presentation to simplify the printing of information or data, avoiding direct printing on the containers.

In order to try to solve at least the problem of the upright arrangement of these containers, it has been suggested to provide, on the bottom of the container, an undercut hollow that is obtained by means of a particular shape of the forming mold and contains the thermal bonding ridge. However, this refinement considerably complicates the execution of the forming mold, and it is not adapted to be used on the lateral surface of the container as well indeed because of problems related to the feasibility of the mold.

Due to the above reasons, the use of containers produced by thermal bonding and thermoforming of a thermoplastic synthetic film has so far been limited to the packaging of samples of products for tests, for advertising, or for the packaging of single-dose products.

SUMMARY OF THE INVENTION

The aim of the present invention is to provide a method that allows to produce containers that are free from the above problems by nonetheless using a film made of thermoplastic synthetic material.

Within the scope of this aim, the object of the invention is to provide a method that allows to obtain containers made of thermoplastic synthetic film, and thus with low production costs, that can be used like conventional containers made of plastics that have a considerably higher cost.

Another object of the invention is to provide a container made of thermoplastic film that can be covered with modern methods for applying a shrink-wrap tubular part.

Another object of the invention is to provide an apparatus for executing the method having production costs comparable with those of conventional apparatuses for the production of containers with thermoplastic films.

This aim, these objects, and others which will become apparent hereinafter are achieved by a method for producing containers, such as bottles or the like, with a film made of thermoplastic synthetic material, which comprises: a step for thermally bonding two strips of film made of thermoplastic synthetic material that face one another so as to form, between said two strips of film, pouches that are open at a longitudinal edge of said strips of film; and a thermoforming step, during which a segment of said two strips of film, in which said pouches are formed, is inserted in a forming mold that is provided with molding cavities that are located at said pouches, and a pressurized fluid is injected into said pouches through their open side to form them, by plastic inflation, inside said molding cavities; characterized in that said thermal bonding of the two strips of film that form said pouches is correlated to the dimensions of said molding cavities to arrange the thermal bonding line, which delimits said pouches, inside the corresponding molding cavity at a preset distance from the walls of said molding cavity when said strips of film are inserted in the forming mold; the thermoforming step being followed by a stage for blanking at least the portions of said strips of film that protrude from the base and from the lateral surface of the contour of the containers that are thermoformed at said pouches.

The method according to the invention is preferably performed by means of an apparatus that comprises: means for the advancement, along an advancement direction, of two mutually facing strips of film made of thermoplastic synthetic material; two thermal-bonding half-molds, which face said two strips of film on opposite sides along the advancement path of said two strips of film and can be moved closer, on command, so as to thermally bond said strips of film to each other along preset lines that delimit, between said two strips of film, pouches that are open at a longitudinal edge of said two strips of film; a thermoforming station, which comprises a forming mold in which there are molding cavities that are adapted to accommodate said pouches, each one of said cavities being provided with an opening at the open side of said pouches; pressurized-fluid injection means that can be inserted in the open side of said pouches through the openings of said molding cavities; characterized in that said thermal-bonding half-molds have, on their side directed towards said strips of film, cavities that correspond to the pouches to be formed and are smaller than the molding cavities of said forming mold.

BRIEF DESCRIPTION OF THE DRAWINGS

Further characteristics and advantages of the invention will become apparent from the description of a preferred but not exclusive embodiment of the method according to the invention, and of the apparatus for performing it, illustrated only by way of non-limitative example in the accompanying drawings, wherein:

FIG. 1 is a schematic top plan view of the apparatus for performing the method according to the invention;

FIG. 14 is a view of a container obtained with the method according to the invention, before the blanking stage;

FIG. 15 is an enlarged-scale sectional view of a portion of the container of FIG. 14, taken along the plane XV—XV, illustrating the blanking stage; and FIG. 16 is a perspective view of a container obtained with the method according to the invention.

DESCRIPTION OF THE PREFERRED EMBODIMENTS

Figure 4:
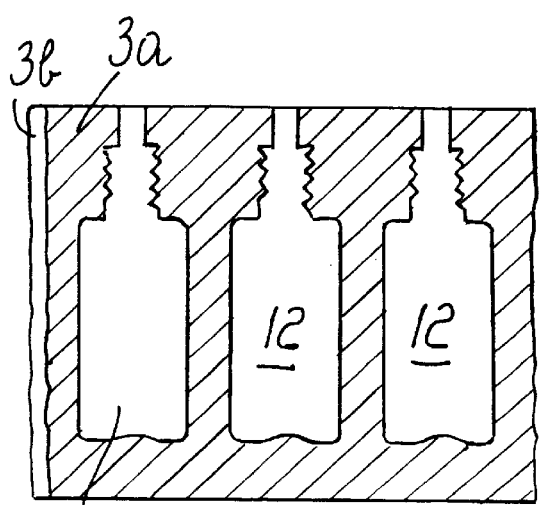
FIG. 4 is a view of a segment of the strips of film at the output of the thermal-bonding half-molds, in which the regions subjected to thermal bonding are shaded.
Figure 7:
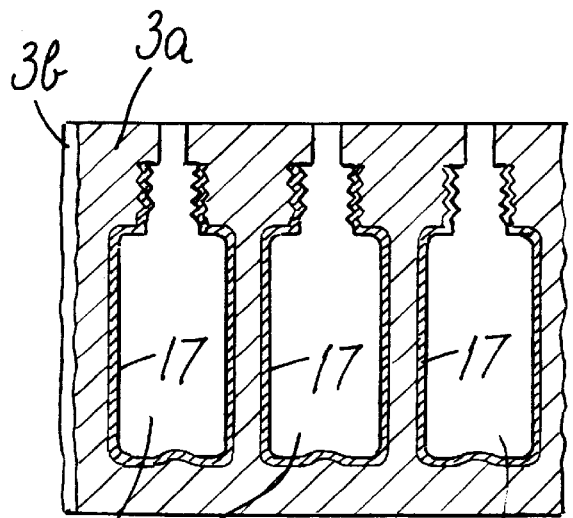
FIG. 7 is a view of a segment of the strips of film at the output of the cooling station, in which the regions subjected to cooling are shaded more heavily.
Figure 2:
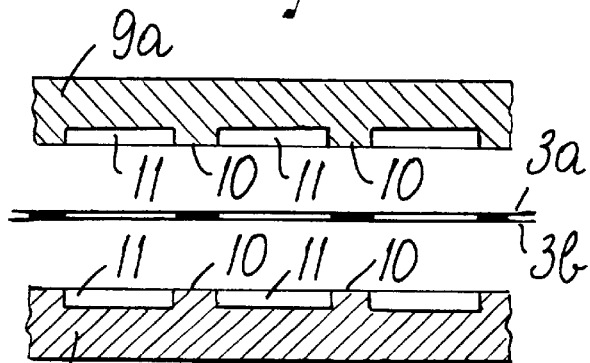
FIG. 2 is an enlarged-scale sectional view of FIG. 1, taken along the plane II—II, illustrating the thermal-bonding half-molds in the open position.
Figure 5:
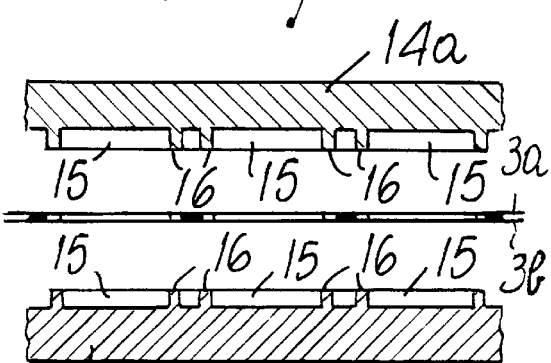
FIG. 5 is an enlarged-scale sectional view of FIG. 1, taken along the plane V—V, illustrating a station for cooling preset regions of the strips of film.
Figure 3:
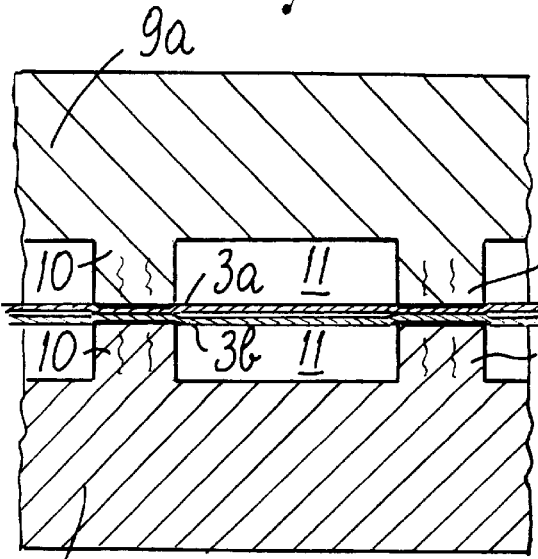
FIG. 3 is an enlarged-scale view of a detail of FIG. 2, with the thermal-bonding half-molds in closed position.
Figure 6:
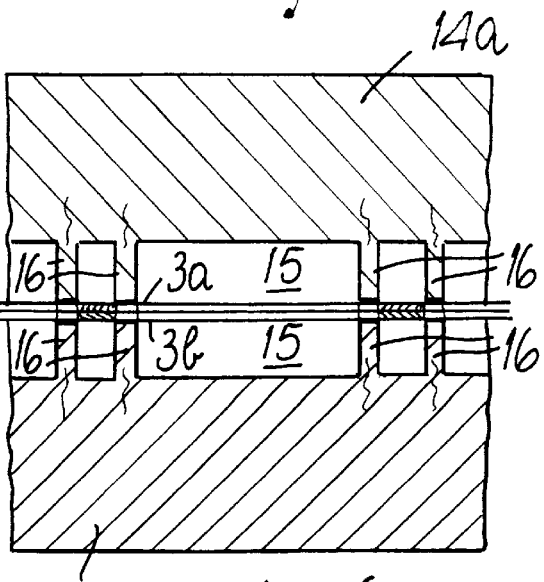
FIG. 6 is an enlarged-scale view of a detail of FIG. 5, during the cooling of preset regions of the strips of film.
Figure 10:
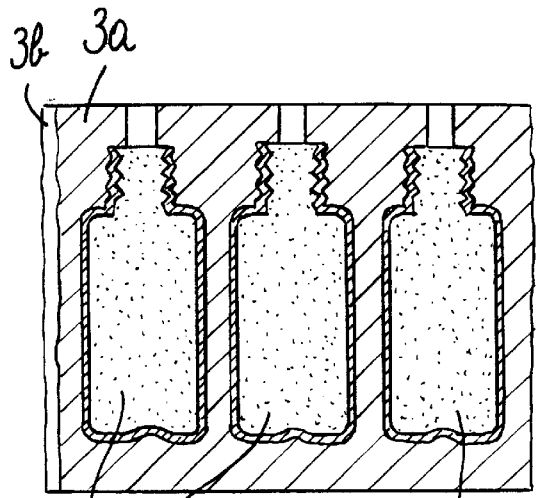
FIG. 10 is a view of a segment of the strips of film at the output of the preheating station, in which the regions subjected to preheating are stippled.
Figure 13:
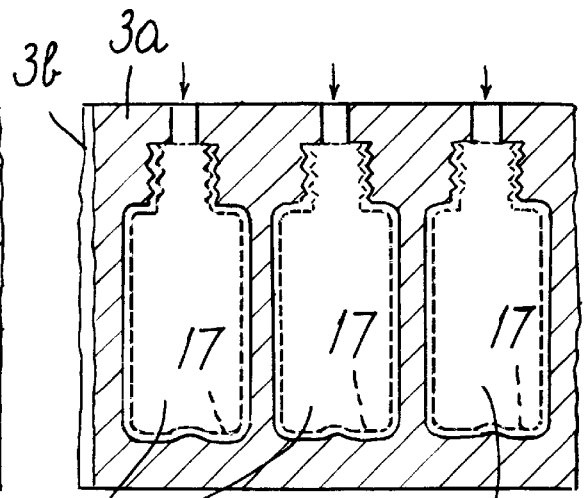
FIG. 13 is a view of a segment of the strips of film at the output of the thermoforming station.
Figure 8:
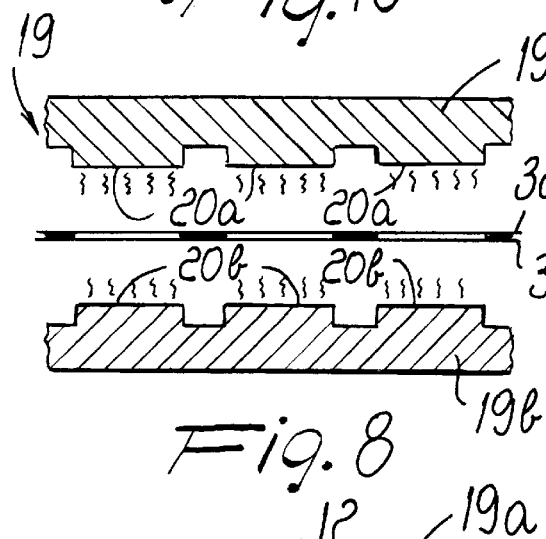
FIG. 8 is an enlarged-scale sectional view of FIG. 1, taken along the plane VIII—VIII, which illustrates a station for preheating preset regions of the strips of film.
Figure 11:
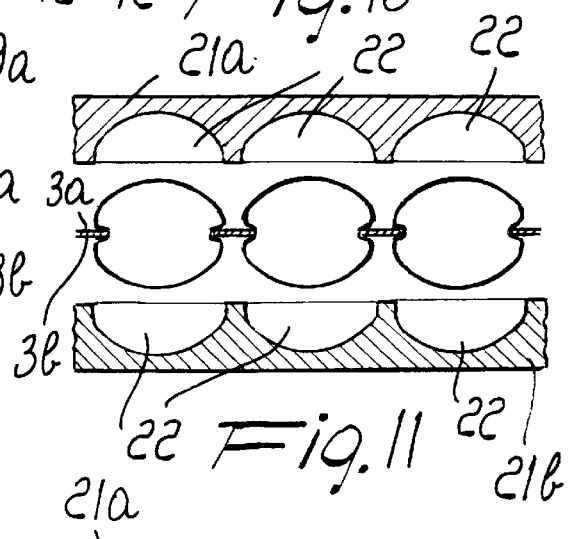
FIG. 11 is an enlarged-scale sectional view of FIG. 1, taken along the plane XI—XI, illustrating the thermoforming station with the mold in open position.
Figure 9:
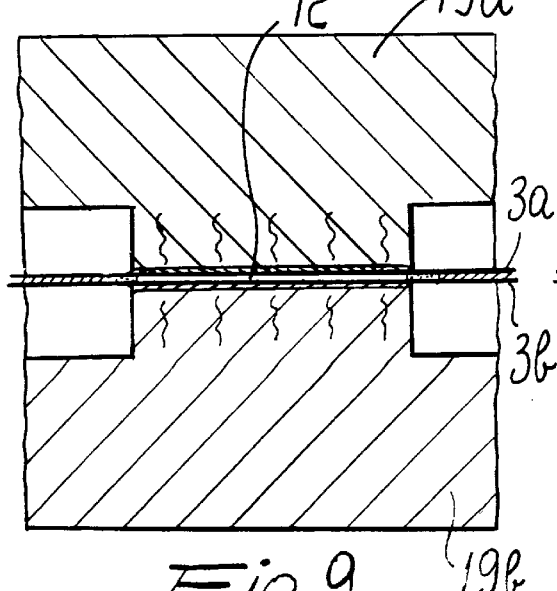
FIG. 9 is an enlarged-scale view of a detail of FIG. 8, during the preheating of preset regions of the strips of film.
Figure 12:
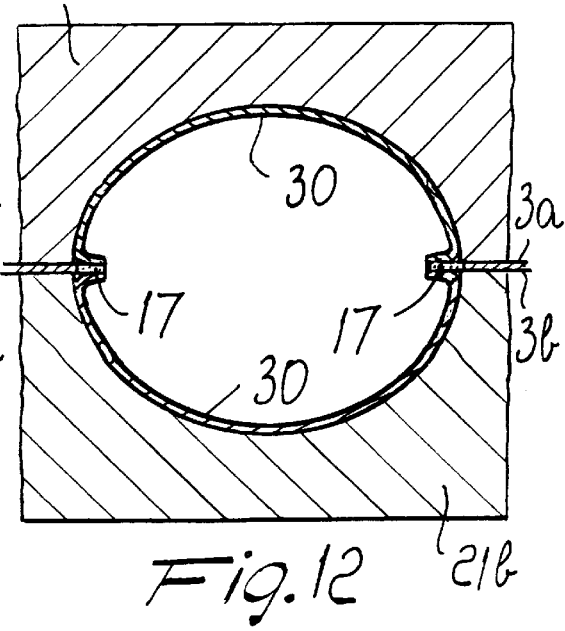
FIG. 12 is an enlarged-scale view of a detail of FIG. 11, with the mold in closed position.

With reference to the above figures, the apparatus for performing the method according to the invention, generally designated by the reference numeral 1, comprises means 2 for the advancement of two strips of film 3a and 3b, which face each other and are preferably superimposed, along an advancement direction that is indicated by the arrow 4 in FIG. 1.

A thermal bonding station 5 is arranged along the path followed by the strips 3a and 3b and a thermoforming station 6 is arranged after said thermal bonding station.

The advancement means 2 can be constituted, in a known manner, by a clamp 7 that is arranged ahead of the thermal bonding station 5 and by a clamp 8 that is arranged downstream of the thermoforming station 6. The clamps 7 and 8 can engage or disengage the strips 3a and 3b on command, and can move, in a reciprocating manner, along the direction 4. The movement of the clamps 7 and 8 is synchronized, so as to produce an intermittent advancement of the strips 3a and 3b along the direction 4 without creasing or stretching the film.

In the clamp 8 that engages the strips 3a and 3b at the output of the thermoforming station 6, the portions that are meant to make contact with the strips 3a and 3b are shaped adequately so as to avoid damaging the strips in the molded regions.

The thermal bonding station 5 comprises thermal bonding means that are constituted by two thermal-bonding half-molds 9a and 9b that face, on opposite sides, the strips 3a and 3b and are kept at a preset temperature, which is necessary to achieve the mutual thermal bonding of the strips 3a and 3b, for example by means of electric resistors, or by means of a heated fluid.

The half-molds 9a and 9b have, on their mutually facing faces, i.e., on the faces directed toward the strips 3a and 3b, raised portions 10 delimiting recessed regions 11 whose shape is similar to that of the containers 30 to be produced.

In practice, the raised portions 10 make contact with the strips 3a and 3b, thermally bonding them, whereas no thermal bonding occurs at the regions 11, so that pouches 12 are formed between the two strips 3a and 3b and are delimited by the thermally-bonded region, which preferably affects the entire remaining part of the strips 3a and 3b.

The thermal-bonding half-molds 9a and 9b are shaped so that the pouches 12 are open at a longitudinal edge of the strips 3a and 3b.

A cooling station 13 is conveniently arranged downstream of the thermal bonding station 5, along the advancement direction 4, and is provided with cooling means that are constituted by two half-molds 14a and 14b that face the strips 3a and 3b on opposite sides and have, on their mutually facing faces, hollows 15 that are delimited by raised portions 16. The hollows 15 are shaped substantially like the recessed regions 11 of the thermal-bonding half-molds, whereas the raised portions 16 preferably have a limited extension around the hollows 15, so as to limit the cooling of the thermally-bonded region of the strips to the region 17 that surrounds the pouches 12.

A preheating station 18 is conveniently provided after the cooling station 13, along the advancement direction 4, and has preheating means 19 that comprise two half-molds 19a and 19b that face the strips 3a and 3b on opposite sides and have raised regions 20a and 20b that are meant to make contact with the regions of the strips 3a and 3b in which the pouches 12 are formed when the half-molds 19a and 19b move mutually closer or when they close.

The half-molds 19a and 19b are heated, in a per se known manner not shown for the sake of simplicity, so as to heat the regions of the strips 3a and 3b with which contact is made.

Downstream of the preheating region 18, again along the advancement direction 4, there is a thermoforming station 6, at which there is a forming mold that is constituted by two half-molds 21a and 21b that face the strips 3a and 3b on opposite sides and in which molding cavities 22 are formed, on the side of said half-molds directed toward the strips 3a and 3b; said cavities are shaped so as to match the containers 30 to be produced.

The half-molds 21a and 21b are provided with channels 23 in their region that is meant to receive the open side of the pouches 12.

Furthermore, the molding cavities 22 preferably have, proximate to the channels 23, a portion 24 with grooves that form a helical pattern about the axis of the corresponding channel, so as to form a threaded neck 31 on the portion of the thermoformed containers 30 proximate to their open side.

Injection means face the channels 23 and are constituted by a blow-molding head 25 with nozzles 26 that are fed, in a known manner, with compressed air and can be inserted, through the channels 23, in the open side of the pouches 12 to produce their plastic inflation, which causes the region of the strips occupied by said pouches 12 to adhere to the walls of the molding cavities 22, performing the molding of the containers 30.

According to the invention, the dimensions of the molding cavities 22 are greater, of a preset amount, than the dimensions of the pouches, i.e., of the recessed regions 11 of the thermal-bonding half-molds 9a and 9b, so that a thermally-bonded portion of the strips 3a and 3b that is proximate to the pouches 12 is located inside the molding cavities 22.

More particularly, the dimensions of the molding cavities 22 are correlated to the dimensions of the cavities 15 and of the raised portions 16 of the half-molds 14a and 14b of the cooling station, so that the thermally-bonded portion that is located inside the molding cavities 22 is the same region that has undergone cooling by virtue of the action of the half-molds 14a and 14b.

At the output of the thermoforming station there are blanking means, not shown for the sake of simplicity, that can be constituted for example by half-molds with cavities that are similar to the molding cavities 22 and with blades at the perimeter of the cavities, so as to cut the portion of the strips 3a and 3b that protrudes from the base and from the lateral surface of the contour of the thermoformed containers 30.

Of course, the cavities and the raised portions of the various half-molds of the thermal-bonding, cooling, preheating, and thermoforming stations are mutually spaced in a corresponding manner, so that at each step of the advancement of the strips 3a and 3b the pouches 12 are positioned correctly with respect to the various cavities or raised portions of the half-molds.

The operation of the apparatus in the execution of the method according to the invention is as follows.

The two superimposed strips of film 3a and 3b are moved intermittently forward along the direction 4 by the clamps 7 and 8 so as to position, in each instance, a segment of the strips at the various stations of the apparatus. Of course, during the advancement of the strips 3a and 3b the half-molds of the various stations are in the open position, i.e., they are mutually spaced so as to avoid hindering the advancement of the strips 3a and 3b.

When the advancement of the strips 3a and 3b is interrupted, the half-molds of the various stations of the apparatus are moved mutually closer, so as to perform a processing step on the strips of film 3a and 3b.

In the thermal-bonding station 5, the closure of the half-molds 9a and 9b causes the mutual thermal bonding of the strips 3a and 3b, except for the regions at the cavities 11, so as to form the pouches 12, which as mentioned are open at a longitudinal edge of the strips 3a and 3b.

In the cooling station 13, the closure of the half-molds 14a and 14b moves the cooled raised portions 16 into contact with the portion 17 of the thermally-bonded portion that is located proximate to the contour of the pouches 12, so as to cool the region 17, which stabilizes, thus ensuring adequate strength of the produced thermal bond.

In the preheating station 18, the closure of the half-molds 19a and 19b preheats the strips 3a and 3b at the pouches 12, so as to increase the plasticity of the strips 3a and 3b in said regions.

In the thermoforming station 6, after the closure of the half-molds 21a and 21b, the blow-molding head 25 is moved closer to the half-molds 21a and 21b, so that the nozzles 26 enter, through the channels 23, the open side of the pouches 12.

The subsequent injection of compressed air in the pouches 12 causes their inflation, with plastic deformation of the strips 3a and 3b at the pouches 12, until the walls of said pouches 12 make contact with the walls of the molding cavities 22, thus obtaining the molding of the containers 30.

As mentioned, the region 17 of the thermal bond that delimits the pouches 12 is inside the molding cavities 22 in this thermoforming stage. Accordingly, during inflation, a recess 17a forms at said region 17 and accommodates said portion 17. By increasing the inflation pressure, it is possible to eliminate this recess substantially completely, so that the region 17 lies practically inside the contour of the molded container.

Once molding has ended, the forming mold is opened and the subsequent advancement of the strips 3a and 3b moves the molded containers 30 away from the forming mold.

The containers 30 thus molded are then separated by means of a blanking operation, which is performed flush to the lateral and bottom contour of the molded container 30 and directly above the region provided with the thread 31.

In this manner, the container 30 is constituted by two strips of film that are thermally bonded along an intermediate plane of the container without any part that protrudes from its contour at the thermal bonds.

It is to be noted that at the thermal bond 17, the thermally-bonded portion of the strips 3a and 3b is blanked flush to the internal cutting diameter of the thread 31, so as to in no way hinder the subsequent screwing, on said thread, of a closure for closing the container.

A recess 32, obtained by means of undercuts in the molding cavities 22, can also be present at the bottom of the container without any problem during the molding stage. The presence of undercuts of limited extent does not hinder the extraction of the containers 30 from the forming mold, since this operation takes advantage of the flexibility of the material that constitutes the strips 3a and 3b.

In practice, it has been observed that the method and the apparatus for performing it, according to the invention, fully achieve the intended aim and objects, since they allow to obtain containers, such as bottles or the like, by virtue of a technique for thermoforming a film of synthetic material without thermally-bonded flaps on the lateral surface and on the bottom of the container. In this manner, although the container has a very low production cost, it can be used for all applications that hitherto required the production of the containers with the extrusion and blowing technique, which is considerably more expensive.

Another advantage is that it is possible to obtain a threaded neck at the open side of the container, so as to allow to close it with a closure.

The method and the apparatus for performing it, as conceived, are susceptible of numerous modifications and variations, all of which are within the scope of the inventive concept; all the details may furthermore be replaced with other technically equivalent elements.

In practice, the materials employed, so long as they are compatible with the specific use, as well as the contingent shapes and dimensions, may be any according to the requirements and the state of the art.

What is claimed is:

1. An apparatus for producing containers with a film made of thermoplastic synthetic material, comprising: advancement means for advancing, along an advancement direction, two facing strips of film made of thermoplastic synthetic material;
    a thermal bonding station including thermal bonding means, which face said two strips of film on opposite sides thereof along said advancement direction of said two strips of film, said thermal bonding means being movable mutually closer, on command, so as to thermally bond said strips of film to each other at preset regions thereof whereby forming thermal bond regions, said bond regions delimiting between said two strips of film, a plurality of pouches that have each an open end at a longitudinal edge end of said two strips of film;
    a cooling station arranged downstream of said thermal bonding station along said advancement direction and including cooling means, said cooling means being shaped so as to carry out a film strip cooling which is limited only to said thermal bond regions;
    a thermoforming station for thermoforming containers from said pouches, arranged downstream of said cooling station and including a forming mold, said mold enclosing molding cavities that are adapted to accommodate each a respective one of said pouches with portions of said thermal bond regions delimiting a respective pouch arranged inside a molding cavity, and each one of said cavities being provided with an opening at said open end of said pouches;
    pressurized-fluid injection means for injecting pressurized fluid in said pouches, said injection means being insertable in said open end of said pouches through the openings of said molding cavities.

2. The apparatus of claim 1, comprising, upstream of said thermoforming station and downstream of said cooling station, along the advancement direction of said strips of film, preheating means for preheating said strips of film at regions thereof where said pouches are formed.

3. The apparatus of claim 1, wherein said cooling means are constituted by two half-molds facing said strips on opposite faces thereof, said half-molds having on opposite faces thereof recessed regions delimited by raised regions, said recessed regions being applied during operation at said thermal bond regions so that said raised regions limit cooling only to said thermal bond regions which are further insertable in said molding cavities of said forming mold.

4. The apparatus of claim 1, wherein said thermal bonding means comprise two thermal-bonding half-molds facing on opposite sides said strips of film.

5. The apparatus of claim 4, wherein said thermal-bonding half-molds have, on a side thereof directed toward said strips of film, cavities having a shape corresponding to that of the pouches to be formed, and said molding cavities of said forming mold have dimensions being greater by a preset amount than the dimensions of said pouches so as to contain, in operation, said portions of said thermal bond regions delimiting a said respective pouch arranged inside a molding cavity.

6. The apparatus of claim 1, further comprising further blanking means for blanking portions of said strips of film protruding from bases and from lateral contour surfaces of the containers that are thermoformed from said pouches.

7. The apparatus of claim 1, wherein each one of said molding cavities has, proximate to said opening for insertion of the injection means, a portion with grooves, said portion lying in a helical pattern about a longitudinal axis of the corresponding opening so as to form a threaded neck on a portion of the thermoformed containers proximate to their open end.

8. An apparatus for producing containers with a film made of thermoplastic synthetic material, comprising: advancement means for advancing, along an advancement direction, two facing strips of film made of thermoplastic synthetic material;
    a thermal bonding station with thermal bonding means including a plurality of recessed regions, said bonding means facing said two strips of film on opposite sides thereof along said advancement direction of said two strips of film and being adapted to thermally bond said strips of film to each other at preset regions thereof whereby forming thermal bond regions, said thermal bond regions delimiting a plurality of pouches formed, between said two strips of film, at said recessed regions of the bonding means, the pouches being formed with an open end at a longitudinal edge end of said two strips of film;
    a cooling station arranged downstream of said thermal bonding station along said advancement direction and including cooling means, said cooling means being shaped so as to carry out a film strip cooling which is limited only to said thermal bond regions;
    a thermoforming station for thermoforming containers from said pouches, arranged downstream of said cooling station and including a forming mold, said mold enclosing molding cavities that are adapted to accommodate each a respective one of said pouches, said molding cavities having dimensions being greater by a preset amount than corresponding dimensions of said pouches so as to contain, in operation, portions of said thermal bond regions delimiting a said respective pouch arranged inside the molding cavity and each one of said cavities being provided with an opening at said open end of said pouches.
    pressurized-fluid injection means for injecting pressurized fluid in said pouches, said injection means being insertable in said open end of said pouches through the openings of said molding cavities.

9. An apparatus for producing containers with a film made of thermoplastic synthetic material, comprising: advancement means for advancing, along an advancement direction, two facing strips of film made of thermoplastic synthetic material;

a thermal bonding station with thermal bonding means including a plurality of recessed regions, said bonding means facing said two strips of film on opposite sides thereof along said advancement direction of said two strips of film and being adapted to thermally bond said strips of film to each other at preset regions thereof whereby forming thermal bond regions, said thermal bond regions delimiting a plurality of pouches formed, between said two strips of film, at said recessed regions of the bonding means, the pouches being formed with an open end at a longitudinal edge end of said two strips of film;

a thermoforming station for thermoforming containers from said pouches, arranged downstream of said cooling station and including a forming mold, said mold enclosing molding cavities that are adapted to accommodate each a respective one of said pouches, said molding cavities having dimensions being greater by a preset amount than corresponding dimensions of said pouches so as to contain, in operation, portions of said thermal bond regions delimiting a said respective pouch arranged inside the molding cavity, and each one of said cavities being provided with an opening at said open end of said pouches;

pressurized-fluid injection means for injecting pressurized fluid in said pouches, said injection means being insertable in said open end of said pouches through the openings of said molding cavities.

\* \* \* \* \*